United States Patent
Mani et al.

(10) Patent No.: US 6,654,734 B1
(45) Date of Patent: Nov. 25, 2003

(54) SYSTEM AND METHOD FOR QUERY PROCESSING AND OPTIMIZATION FOR XML REPOSITORIES

(75) Inventors: Murali Mani, Los Angeles, CA (US); Neelakantan Sundaresan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 09/652,328

(22) Filed: Aug. 30, 2000

(51) Int. Cl.$^7$ .............................................. G06F 17/30
(52) U.S. Cl. ......................... 707/2; 707/10; 707/103.7; 715/513; 715/514
(58) Field of Search ............................ 707/1–6, 9–10, 707/100–104.1; 709/224, 203–204; 705/7.14, 1; 715/513–514

(56) References Cited

U.S. PATENT DOCUMENTS 6,463,440 B1 * 10/2002 Hind et al. ................. 707/102
2002/0169788 A1 * 11/2002 Lee et al. ................. 707/104.1

OTHER PUBLICATIONS

Abiteboul. et al., "The Lorel Query Language for Semistructured Data," International Journal of Digital Libraries, Apr. 1997, 1(1):68–88.

Bohm. K, et al., "Query Optimization for Structured Documents Based on Knowledge of the Document Type Definition," Proceedings of IEEE International Forum on Research and Technology Advances in Digital Libraries (ADL'98), Santa Barabara, California, Apr. 1998, pp. 196–205.

Chen. W. et al., "Efficient Algorithms for Determining the Optimal Execution Strategy for Path Queries in OODBS," Proc. of SEBD'96, San Miniato (Pisa), Jul. 3–5, 1996, pp. 441–452.

Deutsch. A, et al., "Storing Semistructured Data with STORED," SIGMOD Conference, Philadelphia, Pennsylvania, Jun. 1–3, 1999, pp. 431–442.

Goldman. R, et al., "From Semistructured Data to XML: Migrating the Lore Data Model and Query Language," Proceedings of the 2nd International Workshop on the Web and Databases (WebDB '99), Philadelphia, Pennsylvania, Jun. 1999.

Girardot, M, et al., "Millau: an encoding format for efficient representation and exchange of XML documents over the WWW," 9th International World Wide Web Conference, Amsterdam, Netherlands, May 2000.

(List continued on next page.)

Primary Examiner—Jean R. Homere
Assistant Examiner—Mohammad Ali
(74) Attorney, Agent, or Firm—Samuel A. Kassatly (57) ABSTRACT

A computer program product is provided as a system for querying a repository of XML documents. The data in the XML documents are viewed by a query system as a graph that allows queries on content, structure, inter-document links, and intra-document links. The query language uses XML syntax and is based on tree pattern match semantics. The features of the query language allow the query system to compute a DTD for the query language and to use it to validate the user query formulation. Query optimization is done using schema-based optimization and index based optimization. Optimization uses the schema for (a) minimizing the number of documents on which the query need to be executed; (b) eliminating redundant conditions specified in the query; and (c) simplifying expensive query constructs. The query system maintains three sets of indices for each XML document: (a) value indices corresponding to text; (b) structure indices corresponding to tree structure patterns; and (c) link indices corresponding to link relationships.

22 Claims, 6 Drawing Sheets

OTHER PUBLICATIONS

Goldman. R, et al., "DataGuides: Enabling Query Formulation and Optimization in Semistructured Databases," Proceedings of the Twenty–Third International Conference on Very Large Data Bases, Athens, Greece, Aug. 1997, pp. 436–445.

Goldman. R, et al., "Approximate DataGuides," Proceedings of the Workshop on Query Processing for Semistructured Data and Non–Standard Data Formats, Jerusalem, Israel, Jan. 1999.

Liefke. H, et al., "XMill: an Efficient Compressor for XML Data," University of Pennsylvania, Department of Computer Science, Technical Reports, 1999, p. 1–26.

Milo. T, et al., "Index Structures for Path Expressions," 7th International ICDT Conference, Jerusalem, Israel, Jan. 10–12, 1999, pp. 277–295.

Nestorov. S, et al., "Extracting Schema from SemiStructured Data," SIGMOD Conference 1998, 295–306.

Ramesh. B, et al., "Nonlinear Pattern Matching in Trees," Journal of the Association for Computing Machinery, vol. 39, No. 2, Apr. 1992, pp. 295–316.

Shanmughasundaram. J, et al., "Relational Databases for Querying XML Documents: Limitations and Opportunities," Proceedings of the 25th VLDB Conference, Edinburg, Scotland, 1999.

Robie. J, "The Design of XQL," http://www.texcel.no/whitepapers/xql–design.html, printed Jul. 11, 2000.

Robie. J, et al., XML Query Language (XQL), http://www.w3.org/TandS/QL/QL98/pp/xql.html, printed Jul. 11, 2003.

Widom. J, "Data Management for XML Research Directions," http://www–db.stanford.edu/widom/xml–whitepaper.html, printed Jul. 11, 2000.

Extensible Markup Language (XML) 1.0, W3C Recommendation Feb. 10, 1998, http://www.w3.org/TR/REC–XML, printed Jul. 11, 2000.

Deutsch. A, et al., "XML–QL: A Query Language for XML," Submission to the World Wide Web Consortium Aug. 19, 1998, http://www.w3.org/TR/NOTE–XML–ql, printed Jul. 11, 2000.

"Document Object Model (DOM) Level 1 Specification," Version 1.0, W3C Recommendation, Oct. 1, 1998 http://www.w3.org/TR/REC–DOM–Level–1.

W3C XML Specification DTD ("XMLspec") http://www.w3.org/XML/1998/06/XMLspec
report–19980910.htm, printed Jul. 11, 2000.

XML Path Language (XPath) Version 1.0, W3C Recommendation, Nov. 16, 1999, http://www.w3.org/TR/1999/REC–xpath–19991116.

XSL Transformations (XSLT) Version 1.0, W3C Recommendation, Nov. 16, 1999, http://www.w3.org/TR/1999/REC–xslt–19991116.

* cited by examiner

SYSTEM AND METHOD FOR QUERY PROCESSING AND OPTIMIZATION FOR XML REPOSITORIES

FIELD OF THE INVENTION

The present invention relates to the field of data processing, and particularly to a software system and associated method for use with a search engine, to search indexed and raw data obtained from systems that are linked together over an associated network such as the Internet. This invention more particularly pertains to a computer software product for retrieving resources in XML documents through the extensive use of schema (Document Type Definition) for query processing and optimization.

BACKGROUND OF THE INVENTION

The World Wide Web (WWW) is comprised of an expansive network of interconnected computers upon which businesses, governments, groups, and individuals throughout the world maintain inter-linked computer files known as web pages. There is an increasing interest in caching and indexing web pages so as to facilitate the query process using the indexed information. To this end, a crawler crawls the web and extracts metadata, or information about the data on the web, and stores the metadata in a data repository or data store. The vastness of the unstructured WWW causes users to rely primarily on Internet search engines to retrieve or locate information.

Pages on the WWW commonly use HTML as the computer language that describes and displays the page information on the web. HTML is a computer language primarily used for browsing or viewing documents on the web. An HTML document is typically treated as a single block of text, which is easily indexed and searched.

Increasingly, web pages are written using XML, a computer language more complex than HTML that renders information for viewing on the web. Also, the hierarchical nature of XML makes it suitable for describing meta (index) information. The XML standard specification requires that XML documents be well formed, i.e. always have a proper nested structure. However, XML documents need not be valid to meet the XML specification, i.e. the document may not have a schema or may not be validated against an associated schema. In such cases, it is possible to infer the schema from the document. But the multiplicity of non-uniform schemas is difficult, time consuming, and inefficient for a search engine to search or query. To optimize the query process, the number of schemas queried must be minimized.

Traditionally, query process optimization has been focused either on the structure or on the content of the XML document. The optimization technique based on structure or schemas does not look at the entire XML document but rather searches the schema or its Document Type Definition (DTD). DTD is a language that describes the structure of an XML document. This query optimizer extracts from the (DTD) three kinds of structural relationship sets or rules:

Obligation, which for a particular element is the set of dependents that this element must necessarily have.

Exclusivity, which for an element is the set of ancestors that must be present for that particular element.

Entrance location, which describes the elements that should be present in any path between two nodes.

The limitation of this query optimization is that only three structural relationship sets are used. Queries usually contain other structural conditions that are not captured by these three relationships.

The second traditional approach to query optimization is to use indices. Indexing has typically been studied by persons skilled in the database field, who do not consider that indexing to be a requirement for tree pattern matching, but rather consider path indices, which are insufficient for tree pattern matching.

There is therefore still an unsatisfied need for an XML query optimization system that meets the following criteria:

The number of schemas queried by the query optimizer must be minimized in order to optimize the query process with respect to the query processing time and the size of the query index.

An XML document has structure and content that need to be indexed together.

Provides an indexing structure for tree pattern matching.

The structure extracted by the query optimizer must consider all structural relationship sets present in the schema.

Existing query optimization systems do not meet all the foregoing criteria above, and the need for such a system has heretofore remained unsatisfied.

SUMMARY OF THE INVENTION

This invention describes a system and method this need, and provide the capability to optimize the XML document query process by:

minimizing the number of schemas examined by a search engine by reducing the number of different schemas in the data store;

indexing both structure and content of the XML document to minimize the number of steps in the query process; and extracting from the DTD all structural relationship sets applying to a specific XML document.

This feature will enable the system of the present invention to minimize the time required to process a search request while also minimizing data storage requirements.

The query system of the present invention provides several features and advantages, related to the following:

data model;

query language; and index format.

The data model of the query system of the present invention views the XML repository as a set of schema/data pairs where, for every schema, the query system maintains the set of documents that conform to that schema. The data in an XML document is viewed by the query system as a graph with the "edges" between the graphs used to represent inter-document links. This data model allows queries on content, structure, plus inter-document links and intra-document links.

The query language uses XML syntax and supports tree pattern matching. This allows the query system to compute a DTD for the query language and use it to validate the user query during query formulation. Using a tree structure instead of the traditional path expression, makes the query language easier to use, and allows the query language to specify conditions on siblings in the tree structure. The query language also:

returns both the subtree rooted at the element and the element (with or without attributes);

allows restructuring of documents, since many queries require the query result in a different structure than the source document;

allows specification of grouping result elements;

supports specifications of regular path expressions for reaching an element;

supports queries on the order among child nodes;

identifies data types associated with the different content values in a XML document;

supports common database constructs for supporting set operations;

supports the semantic as well as the literal view for both intra-document and inter-document links; and queries the text content of the nodes of an XML document individually, combined at the node level, and combined at the subtree level.

The query system of this invention maintains three kinds of indices for an XML document: a value index corresponding to text; a structure index corresponding to tree structure patterns; and a link index corresponding to link relationships. These indices are organized as a trie, ensuring that the index access cost is linear with respect to the size of the query and independent of the number of indices present. For storage and search efficiency, the structure pattern is converted to a string.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF THE INVENTION

The following definitions and explanations provide background information pertaining to the technical field of the present invention, and are intended to facilitate the understanding of the present invention without limiting its scope:

API (application program interface): A specific method prescribed by a computer operating system or by another application program by which a programmer writing an application program can make requests of the operating system or another application.

Child (also daughter): From graph theory, a node pointed to by a path from a parent.

Crawler: A program that automatically explores the World Wide Web by retrieving a document and recursively retrieving some or all the documents that are linked to it.

DOCTYPE declaration: An XML document type declaration that contains or points to markup declarations which provide a grammar for a class of documents. The Name in the document type declaration matches the element type of the root element.

DOM (Document Object Model): A platform- and language-neutral interface that allows programs and scripts to dynamically access and update the content, structure and style of documents. The Document Object Model provides a standard set of objects for representing HTML and XML documents, a standard model of how these objects can be combined, and a standard interface for accessing and manipulating them.

DTD (Document Type Definition): defines the schema of semi-structured documents such as SGML (Standard Generalized Markup Language), HTML, or XML documents.

Element: "Tagged" text; text encoded with formatting or other information.

Internet: A collection of interconnected public and private computer networks that are linked together with routers by a set of standards protocols to form a global, distributed network.

Leaf: Terminal node of a tree; a node with no child/daughter.

Node: A point or vertex in a graph.

Parent: A node (as in a graph) with a successor (child/daughter).

Path: The sequence of nodes encountered in the route between any two nodes (inclusive).

QEP (Query Execution Plan): An execution plan that instructs the server how to process a statement.

Root node: A node with no parent but typically with children.

Schema: Format or structure. It defines the structure and type of contents of constituent structures of, for example, a database, XML documents, etc.

Search engine: A remotely accessible World Wide Web tool that allows users to conduct keyword searches for information on the Internet.

Semi-structured: Implying a schema either explicitly or implicitly.

Server: A software program or a computer that responds to requests from a client.

Tags: Codes (as in HTML or XML) that give instructions for formatting or action.

Tree: A hierarchical structure that is made up by nodes. Nodes are connected by edges from one node (parent) to another (child). A single node at apex of the tree is known as the root node, while the terminus of a path in the opposite direction is a leaf.

Trie: A tree data structure used to efficiently store and search a set of strings. The trie has the following property: at most one node in the trie corresponds to a prefix.

URL (Uniform Resource Locator): A unique address that fully specifies the location of a content object on the Internet. The general format of a URL is protocol://server-address/path/filename.

Web browser: A software program that allows users to request and read hypertext documents. The browser gives some means of viewing the contents of web documents and of navigating from one document to another.

Web document or page: A collection of data available on the World Wide Web and identified by a URL. In the simplest, most common case, a web page is a file written in HTML and stored on a web server. It is possible for the server to generate pages dynamically in response to a request from the user. A web page can be in any format that a web browser or a helper application can display. The format is transmitted as part of the headers of the response as a MIME type, e.g. "text/html", "image/gif". An HTML web page will typically refer to other web pages and Internet resources by including hypertext links.

Web Site: A database or other collection of inter-linked hypertext documents ("web documents" or "web pages") and associated data entities, which is accessible via a computer network, and which forms part of a larger, distributed informational system such as the WWW. In general, a web site corresponds to a particular Internet domain name, and includes the content of a particular organization. Other types of web sites may include, for example, a hypertext database of a corporate "intranet" (i.e., an internal network which uses standard Internet protocols), or a site of a hypertext system that uses document retrieval protocols other than those of the WWW.

World Wide Web (WWW): An Internet client—server hypertext distributed information retrieval system.

XML: extensible Markup Language. A standard, semi-structured language used for Web documents. During a document authoring stage, XML "tags" are embedded within the informational content of the document. When the web document (or "XML document") is subsequently transmitted by a web server to a web browser, the tags are interpreted by the browser and used to parse and display the document. In addition to specifying how the web browser is to display the document, XML tags can be used to create hyperlinks to other web documents.

Figure 1:
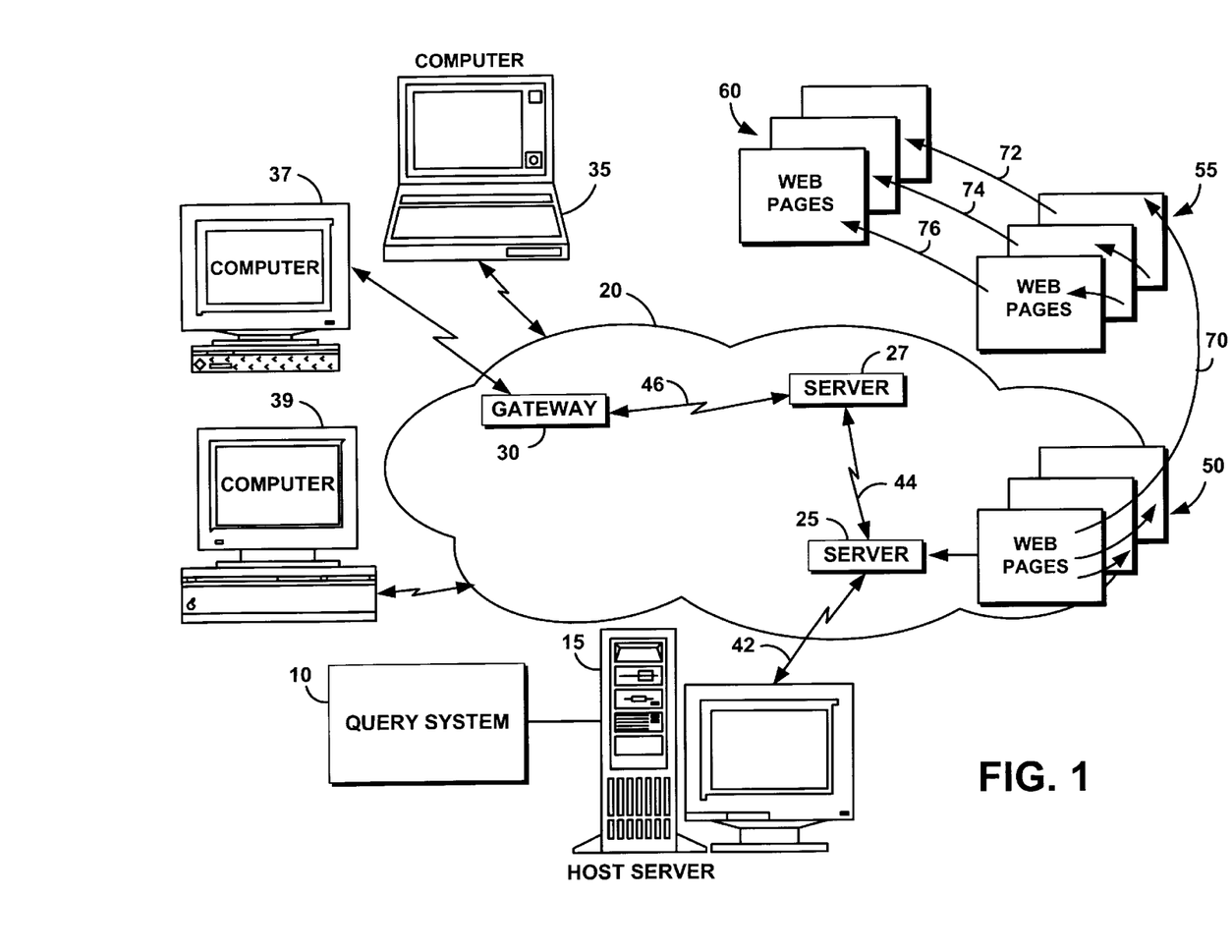
FIG. 1 is a schematic illustration of an exemplary operating environment in which a query system of the present invention can be used.

FIG. 1 portrays the overall environment in which a query system 10 according to the present invention may be used. The query system 10 includes a software or computer program product that is typically embedded within, or installed on a host server 15. Alternatively, the query system 10 can be saved on a suitable storage medium such as a diskette, a CD, a hard drive, or like devices. While the query system 10 will be described in connection with the WWW, the query system 10 can be used with a stand-alone database of terms that may have been derived from the WWW and/or other sources.

The cloud-like communication network 20 is comprised of communication lines and switches connecting servers such as servers 25, 27, to gateways such as gateway 30. The servers 25, 27 and the gateway 30 provide the communication access to the WWW Internet. Users, such as remote Internet users are represented by a variety of computers such as computers 35, 37, 39, and can query the host server 15 for the desired information.

The host server 15 is connected to the network 20 via a communications link 42 such as a telephone, cable, or satellite link. The servers 25, 27 can be connected via high speed Internet network lines 44, 46 to other computers and gateways. The servers 25, 27 provide access to stored information such as XML or web documents indicated generally at 50, 55, and 60. The XML documents 50, 55, 60 most likely include embedded links to other locally stored pages, and links 70, 72, 74, 76 to other web sites or documents 55, 60 that are stored by various web servers such as the server 27.

Figure 2:
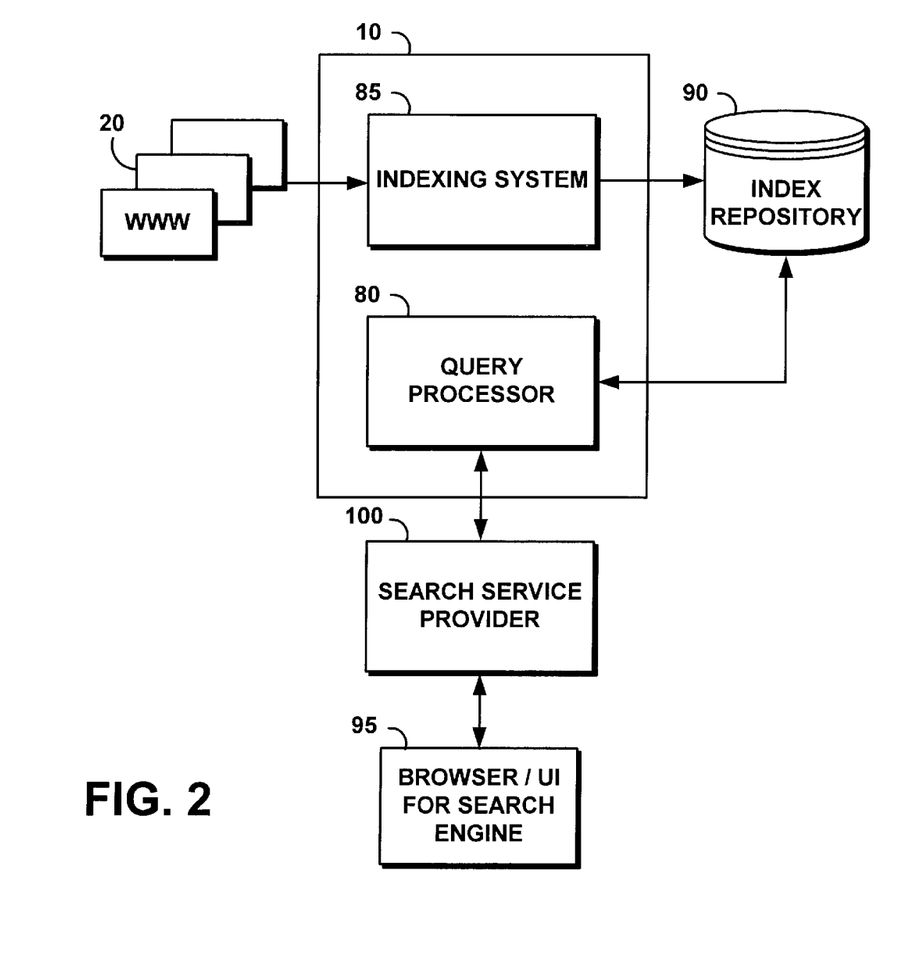
FIG. 2 is a block diagram that illustrates the two main components of the query system of FIG. 1, the indexing system and the query processor, shown used in the context of an Internet search.

The XML documents 50, 55, 60 can be represented as the WWW 20 in FIG. 2. Searches on the WWW 20 are performed by the query system 10. The query system 10 generally includes a query processor 80 and an indexing system 85. The indexing system 85 extracts data from the XML documents on the WWW 20 and stores that data in the index repository 90 as XML documents.

In use, the user enters a query through the browser for search engine 95. The search service provider 100 forwards the query to the query system 10. The query processor 80 then generates a Query Execution Plan (QEP) that specifies any indices for use in the search. The QEP is optimized for the document object model (DOM). The DOM is an application program interface (API) used in this case for traversing the XML document tree structure in the index repository 90.

The QEP retrieves the index document stored on the index repository 90 by means of a set of index keys. These index keys are stored in the index repository 90, with each index key storing the set of references within the document. The QEP looks up the specified index structures for a key K, and obtains the set of element references. It then looks up the source document and retrieves the elements corresponding to these references.

Figure 3:
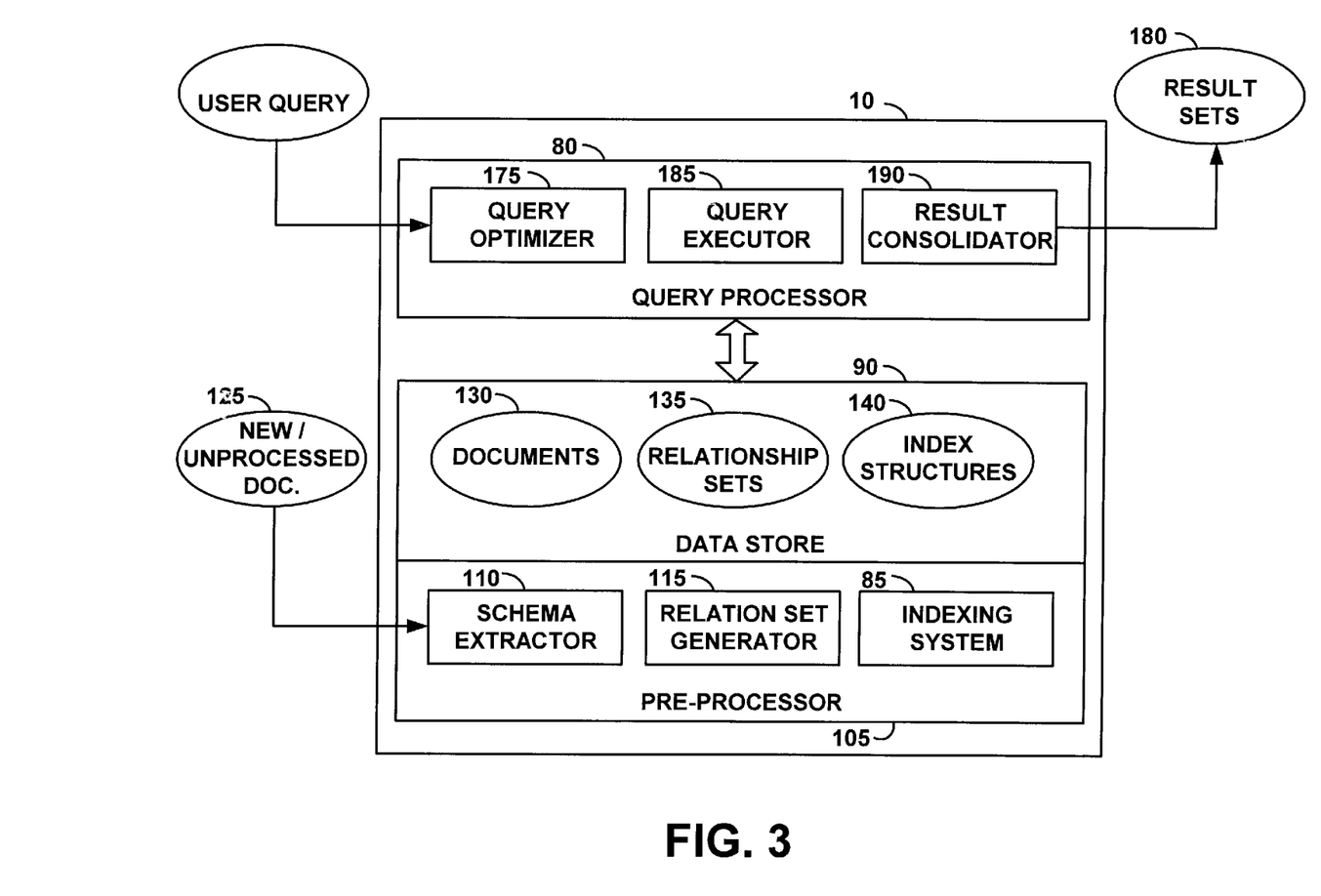
FIG. 3 is a block diagram that depicts the main components of the query system of FIGS. 1 and 2.

FIG. 3 shows the main components of the query system 10 used for processing and indexing XML documents. The query system 10 generally includes two main components: a preprocessor 105 and a query processor 80 of FIG. 2.

The preprocessor 105 is used to optimize query execution and includes a schema extractor 110, a relation set generator 115, and an indexing system 85. Data generated by the preprocessor 105 are stored in the index repository 90. The schema extractor 110 first extracts the schema for new or unprocessed documents 125. If the new or unprocessed document 125 does not have a schema, the schema extractor 110 discovers a schema for this document 125, as described for example in co-pending patent application titled "Method and System for Discovering a Majority Schema in Semi-structured Data", filed on Jul. 27, 2000, assigned to the same assignee as the same application, and incorporated herein by reference. The results of the schema extractor 110 are stored in the index repository 90 as documents 130. The DTD and the data in the document 130 are then used by the other components of the preprocessor 105.

The relation set generator 115 computes structural relationship sets 135 between elements and attributes from the schema (either defined or discovered by the schema extractor 110). These structural relationship sets 135 are later used for query optimization and processing. The relation set generator 115 computes eight different structural relationship sets; child, parent, attribute, reachability, ancestor, obligation, exclusivity, and entrance location. Only obligation, exclusivity, and entrance location are examined by existing XML query systems. These eight structural relationship sets are used by the query system 10 to filter documents that will produce an empty result set, for strength reduction of the user query, i.e. to replace complex query constructs with simpler ones and eliminate redundant conditions. A description of these structural relationship sets 135 and how they are determined is given below.

Child

The child structural relationship set for an element A denoted by C(A) is given by:

$$C(A)=\{(C_1, T_1), (C_2, T_2), \ldots, (C_n, T_n)\}$$

where $C_1, C_2, \ldots, C_n$ represent all the child elements which A can have. $T_i$ associated with a $C_i$ denotes the derived parent-child relationship between A and $C_i$. This can be either +, *, ? or ONCE. ONCE is used to denote a child that can occur exactly once.

Parent

The parent structural relationship set for an element A, denoted by P(A) is defined as:

$$P(A)=\{P_1, P_2, \ldots, P_n\}$$

where $P_1$, $1 \leq q \leq n$ represents a possible parent element for A.

Attribute

The attribute relation set for an element A is given by:

$$Attr(A)=\{(At_1, Dec_1, Def_1, Val_1), (At_2, Dec_2, Def_2, Val_2), \ldots, (At_n, Dec_n, Def_n, Val_n)\}$$

where $At_1, At_2, \ldots, At_n$ are the name of all the attributes which A can have. $Dec_i$ denotes the declared type of $At_i$, $Def_i$ denotes the default type of $At_i$ and $Val_i$ denotes the default string value defined for that attribute (if any).

Reachability

The reachability set for an element A, denoted by R(A) is given by:

$R(A)=\{(A_1, L_1), (A_2, L_2), \ldots, (A_{n1} L_n)\}$ where $A_1, A_2, \ldots, A_n$ are possible descendants of A as computed from the DTD graph. The $L_i$ associated with $A_i$ represent the set of levels at which $A_i$ can be present as a descendant of A. The reachability set for the leaf nodes in the graph is the empty set. For convenience of explanation, we define a set R'(A) which is obtained from R(A) by omitting the level information:

$$R'(A)=\{A_1, A_2, \ldots, A_n\}$$

The set R'(A) represents the set of elements which can be present as a descendant of A in a document conforming to the DTD. For an element A which has n children denoted by $S=\{C_1, C_2, \ldots, C_n\}$, the recurrence relation used to obtain the set R'(A) is given by:

$$R'(A)=C_1\cup R'(C_1)\cup C_2\cup R'(C_2)\cup \ldots \cup C_n\cup R'(C_n)$$

The level information for an element $A_i \in R'(A)$ is obtained as follows. Let $D_1, D_2, \ldots, D_k \subseteq S$ be such that $A_i \in R'(D_j)|1\leq j\leq k$. Let $L_i(B)$ represent the set of levels associated with $A_i$ in the reachability set for B. Then $$L_i(A)=L'_i(D_1)\cup L'_i(D_2)\cup \ldots \cup L'_i(D_k)$$

$$L'_i(E)=\{e_1+1, e_2+1, \ldots, e_p+1\}|L_i(E)=\{e_1, e_2, \ldots, e_p\}$$

Ancestor

The ancestor structural relationship set for an element A denoted by G(A) is given by:

$$G(A)=\{(P_1, L_1), (P_2, L_2), \ldots, (P_n, L_n)\}$$

where Pi, $1\leq i\leq n$ represents a possible ancestor element which can be present in the document. The level information, $L_i$ associated with an ancestor, $P_i$ represents the set of levels at which $P_i$ can be present as an ancestor with respect to A. The ancestor structural relationship sets can be computed from the reachability structural relationship sets as follows. If $(E_i, L_j) \in R(A)$, then $(A, L_j) \in G(E_i)$.

Obligation

The obligation set for an element A denoted by O(A) is given by:

$$O(A)=\{(A_1, L_1), (A_2, L_2), \ldots, (A_n, L_n)\}$$

where $A_1, A_2, \ldots, A_n$ are descendants of A that must be present in every document conforming to the DTD. The $L_i$ associated with $A_i$ represents the set of levels at which $A_i$ can be present as a descendant of A. This is the same as the set of levels present in the reachability set. As for the reachability set, we define a set O'(A) which is obtained from O(A) by omitting the level information.

$$O'(A)=\{A1, A2, \ldots, An\}$$

Consider an example in which element A's content model is given by:

$$A\rightarrow((((C_1|C_2), C_3)|C_4?), C_5^*, C_2)$$

In computing the obligation set of an element A, content model subtrees with the * or ? operators are ignored. This reduces the above content model to $(((C_1|C_2), C_3), C_2)$. Then an AND-OR tree is constructed with AND representing ",", and OR representing "|" with the elements as the leafs. The obligation set O"(N) for a node N in the AND-OR tree is computed recursively as follows.

For an element node (leaf node), O"(N)=O'(N).

For a node N, we define Contrib(N)=O"(N)∪N if N is a leaf node, and O"(N), otherwise.

For an AND node N, with n child nodes $C_1, C_2, \ldots, C_n$ (the child nodes can be OR nodes or element nodes), the obligation set is given by:

$O"(N)=\cup_{i=0}^n$ Contrib($C_i$).

For an OR node N, with n child nodes $C_1, C_2, \ldots, C_n$ (the child nodes can be AND nodes or element nodes), the obligation set is given by $O"(N)=\cup_{i=0}^n$ Contrib($Ci$).

Exclusivity

The exclusivity set for an element A, denoted by E(A) is given by:

$$E(A)=\{(A_1, L_1), (A_2, L_2), \ldots, (A_n, L_n)\}$$

where $A_1, A_2, \ldots A_n$ are ancestors of A that must be present in every document conforming to the DTD. The level set $L_i$ associated with an element $A_i$ represents the set of levels at which $A_i$ can be present as an ancestor of A. (This is the same as the set of levels at which A can be present as a descendant of $A_i$ obtained in the reachability sets.) Let E'(A) denote the exclusivity structural relationship set for A without the level information, that is $E'(A)=\{A_1, A_2, \ldots, A_n\}$. For an element A with n possible parents, $P1, P_2, \ldots, P_n$, E'(A) is defined recursively as follows:

$$E'(A)=(P_1\cup E'(P_1))\cap (P_2\cup E'(P_2))\cup \ldots \cup (P_n\cup E'(P_n))$$

Entrance Location

The entrance location set for an element A, denoted by EL(A) is given by:

$$EL(A)=\{(B_1, \{(C_{11}, L_{111}, L_{112}), (C_{12}, L_{121}, L_{122}) \ldots (C_{1n_1}, L_{1n_11}, L_{1n_12})\}),$$

$$(B_2, \{(C_{21}, L_{211}, L_{212}), (C_{22}, L_{221}, L_{222}) \ldots (C_{2n_2}, L_{2n_21}, L_{2n_22})\}), \ldots,$$

$$(B_k, \{(C_{k1}, L_{k11}, L_{k12}), (C_{k2}, L_{k21}, L_{k22}) \ldots (C_{kn_k}, L_{kn_k1}, L_{kn_k2})\})\}$$

The above equation says that for every occurrence of the path $(B_i, A)$ in the XML document, there always exist the elements $\{C_{i1}, C_{i2}, \ldots, C_{in_i}\}$ in the $(B_i, A)$ path. The level information associated with an element $C_{ij}$ is given by two sets of levels. $L_{ij1}$ represents the set of levels at which $C_{ij}$ can be present as a descendant of $B_i$, and $L_{ij2}$ represents the set of levels at which A can be present as a descendant of $C_{ij}$. Again the level information is obtained from the reachability sets. Therefore we define EL'(A) as:

$$EL'(A)=\{(B_1, \{C_{11}, C_{12}, \ldots C_{1n_1}\}),$$

$$(B_2, \{C_{21}, C_{22}, \ldots C_{2n_2}\}), \ldots,$$

$$(B_k, \{C_{k1}, C_{k2}, \ldots C_{kn_k}\})$$

For an element, A with n possible parents, $\{P_1, P_2, \ldots, P_n\}$, the entrance location is obtained as follows.

For every parent $P_i$, we add $(P_i, \{ \})$ to the entrance location structural relationship set.

If two parents, $P_i$ and $P_j$ have the terms $(B_1, S_1)$ and $(B_1, S_2)$ respectively in the entrance location sets, then the set for A will contain $(B_1, ((P_i\cup S_1)\cup(P_j\cup S_2)))$.

Various index structures for the new or unprocessed document 125 of FIG. 3 are built by the indexing system 85. The resulting index structures 140 are stored in the index repository 90. The indexing system 85 is shown in more detail in FIG. 4.

Three types of indices are maintained by the indexing system 85 (FIG. 4): a value index 145 corresponding to the text; a structure index 150 corresponding to the tree structure patterns, and a link index. The link index can be maintained as simple mappings from ID names to elements. The value index 145 includes a text index 155 and an attribute index 160. For each element in the XML document, the indexing system 85 finds the different text values and stores in the text index 155 the element references that have this value. The attribute index 160 maintains a list of references for the text values of each element and each attribute within the element.

Figure 4:
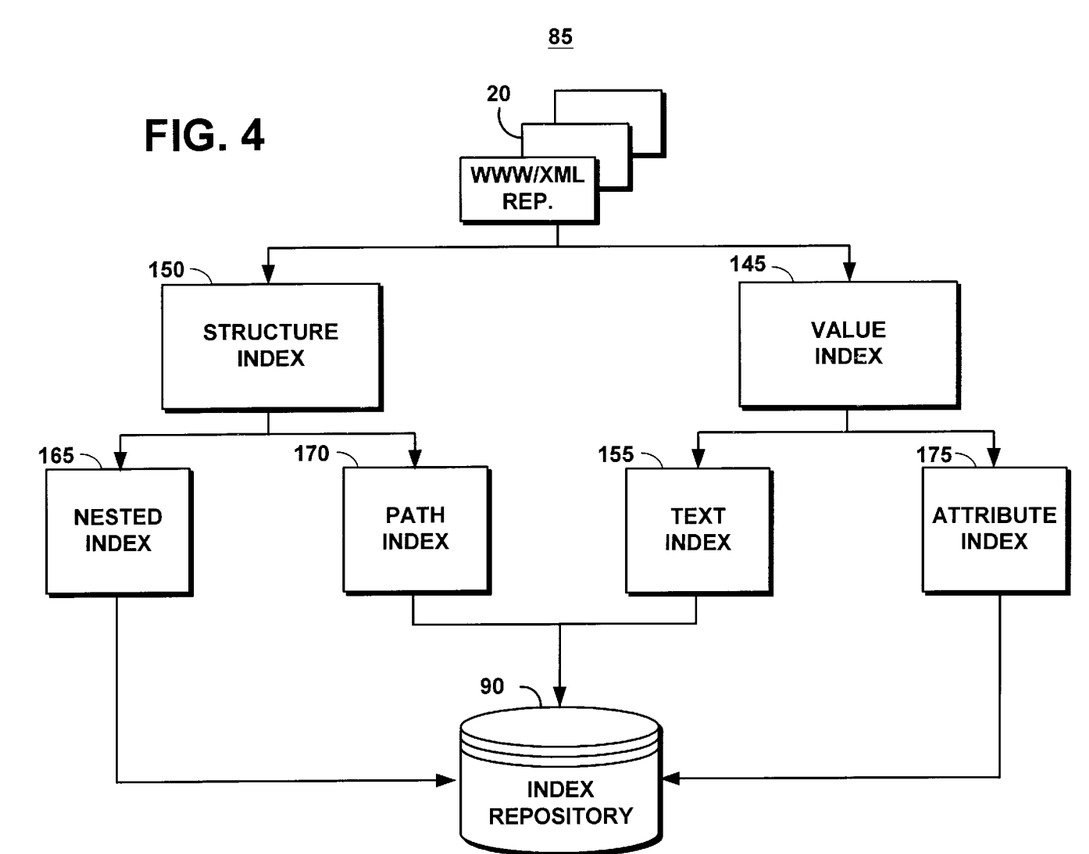
FIG. 4 depicts the components of a query processor of FIG. 2 that forms part of the query system of FIGS. 1–3.

Tree indexing represents a novel feature of the present invention. A tree index can be a nested index 165 or a path index 170. Reference is made to Chen. W, Aberer. K, Neuhold. E. J, "Efficient Algorithms for Determining the Optimal Execution Strategy for Path Queries in OODBS," Proc. of SEBD'96, San Miniato (Pisa), Jul. 3–5, 1996, pp. 441–452. For a particular pattern, the nested index 165 maintains the set of references to all the elements that satisfy this pattern. The path index 170 maintains references for elements that satisfy every sub-pattern.

A tree pattern is converted to a string (e.g. Euler string) by the query system 10. A tree pattern is considered as having multiple sub-patterns, corresponding to each position in the Euler string. For example, in the following Euler string "book.author.book.author.book" there are five sub-patterns:

1. book
2. book.author
3. book.author.book
4. book.author.book.author
5. book.author.book.author.book All the structure indices are converted into Euler strings and stored as a trie. All four indices of FIG. 4 are stored as an XML document, but in a restricted format. The query executor 185 (FIG. 3) uses the available indices as well as the structural relationship sets for optimization.

The query processor 80 of FIG. 3 performs the queries and returns the result set 180 to the user. The query processor 80 includes three parts: the query optimizer 175, the query executor 185, and the result consolidator 190. The query optimizer 175 builds an "optimal" QEP for the document. The query executor 185 executes the QEP obtained by the query optimizer 175. A schema generator then computes the schema (DTD) for the result set 180, creating an output document for the result set 180.

An important feature of the query system 10 of this invention is the manner in which data is viewed. An XML document is viewed by the query system as a graph with the "edges" between the graphs used to represent inter-document links. This data model allows queries on content, structure, plus inter-ocument links and intra-document links. XML is used to represent both hierarchical structure and data. Structure is represented using nested elements and data is represented using text nodes and attribute values. The example below shows a sample XML document and a DTD for that document. This document represents a small library database consisting of two books and one monograph.

DTD for example database:
```
<!DOCTYPE library [
  <!ELEMENT library (book/monograph)*>
  <!ELEMENT book (title, author*, publisher?)>
  <!ELEMENT title (#PCDATA)>
  <!ELEMENT author EMPTY>
  <!ATTLIST author firstName CDATA #REQUIRED
    middleInitial CDATA #IMPLIED lastName CDATA
    #REQUIRED>
  <!ELEMENT publisher (#PCDATA)>
  <!ELEMENT monograph (title, editor+, publisher?)>
  <!ELEMENT editor (monograph*)>
  <!ATTLIST editor firstName CDATA #REQUIRED
    middleInitial CDATA #IMPLIED lastName CDATA
    #REQUIRED>
]>
```

XML Document for example database:
```
<library>
  <book>
    <title>The XML Handbook</title>
    <author firstName="Charles" middleInitial="F"
      lastName="Goldfarb"/>
    <author firstName="Paul" lastName="Prescod"/>
    <publisher>Prentice Hall</publisher>
  <book>
  <book>
    <title>XML Complete</title>
    <author firstName="Steven" lastName="Holzner"/>
    <publisher>McGraw-Hill</publisher>
  </book>
  <monograph>
    <title>Active rules in database systems</title><editor firstName="Norman" middleInitial="W" lastName/="Paton"/><publisher>New York: Springer</publisher>
  </monograph>
</library>
```

Figure 5:
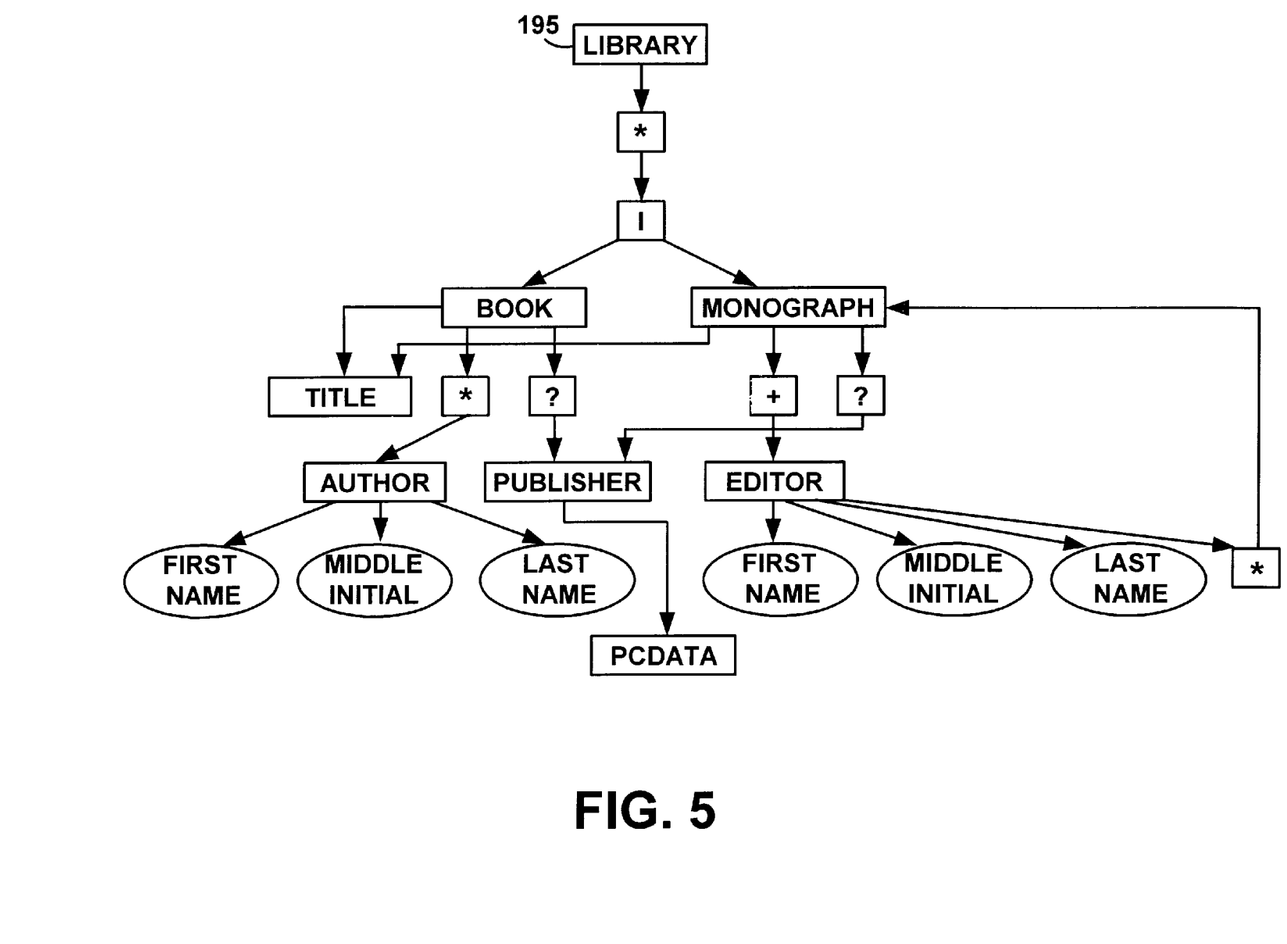
FIG. 5 is a graphical representation of an exemplary DTD used by the query system of FIG. 3.

The query system 10 views the DTD as a directed graph, rooted at an element called the DOCTYPE declaration. FIG. 5 shows the directed graph view of the database example, where the DOCTYPE declaration is "library" 195. Elements, attributes, and the regular expression operators are used to represent the content model form nodes in the graph. The DTD semantics are not completely captured by relational schemas as DTD "simplification" is important for XML-relational conversion.

Figure 6:
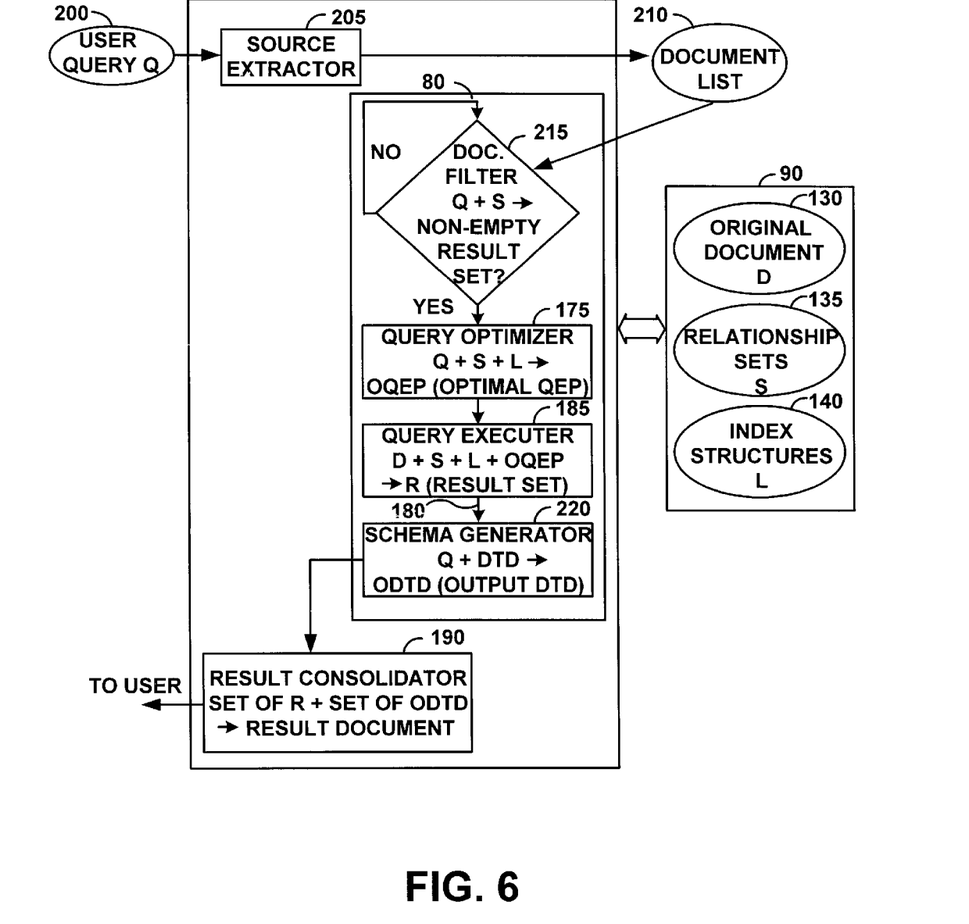
FIG. 6 is a bock diagram representing the query process according to the present invention.

FIG. 6 shows a more detailed description of a method of operation 200 for the query processor 80 of FIG. 3. Given a query (Q) 201, a source extractor 205 first extracts the source documents on which the query will be executed, creating the document list 210. A source specified in the query 201 can be either a document in the repository 90 or the result set of a nested query.

A document filter 215 then uses the pre-computed structural relationship sets 135 (S) to eliminate documents that do not qualify for the query (Q) 201. This allows the query system 10 to avoid querying documents that will not contribute to the result set. By eliminating empty results for the query 201, processing time is dramatically reduced. If (Q+S) generates a non-empty result, the query processor 80 proceeds to the query optimizer 175. If (Q+S) generates an empty result, the query processor 80 loops back and considers the next document.

Table 1 lists some sample conditions in the query and the corresponding conditions in the structural relationship set that cause a document to be eliminated. As an example, Table 1 enumerates conditions for a source document D in the document list for query Q to be filtered out. S(D) denotes the relationship sets computed for D. In item 1, the query requires that B be a descendant of A at one of the depths in L, but from the reachability sets, it is known that B is not a descendant of A at any of the depths in L. The query in item 5 requires that A have two child elements with tag name B, but from the child relationship sets, it is known that A can have at most one child which is B. The query in item 6 requires that A have an attribute At with value V, but from the attribute relationship sets, it is known that A cannot have an attribute At.

TABLE 1

| No. | Condition specified in Q | Condition present in S(D) for D to be filtered out |
|---|---|---|
| 1 | (B, L) ∈ Des(A) | ((B, _) ∉ R(A) OR (((B, L') ∈ R(A)) AND (L ∩ L' = φ))) |
| 2 | (B, L) ∈ Anc(A) | ((B, _) ∉ G(A) OR (((B, L') ∈ G(A)) AND (L ∩ L' = φ))) |
| 3 | (B, L) ∉ Des(A) | ((B, L') ∈ O(A) AND (L' ⊆ L)) |
| 4 | (B, L) ∉ Anc(A) | ((C,L') ∈ E(A) AND (L' ⊆ L)) |
| 5 | B, B ∈ Child(A) | (((B, UNCE) ∈ C(A)) OR ((B, ?) ∈ C(A))) |
| 6 | (At, V) ∈ Attrib(A) | (At,_, _, _) ∉ Attr(A) |

The query optimizer 175 of FIGS. 3 and 6 performs two tasks: strength reduction of expensive query constructs and choice of an optimal QEP. Strength reduction involves eliminating redundant query constructs and replacing expensive constructs with simpler constructs. For example, an expensive construct would be a query for all descendents of books that are authors; a simpler construct to obtain the same result would be a query for children of books that are authors. The expensive construct asks the query system to select all books from the document at any depth from the document root level that satisfy the remaining conditions. However, from the reachability sets, the query system knows that book elements can only be present at a height of 1 from the document root level, so the query system need only check the child elements for books.

A few exemplary conditions for using the structural relationship sets for strength reduction are illustrated in Table 2. Table 2, shows strength reduction of the user query as implemented by the query optimizer 175, wherein C represents the condition specified in the original query, S(D) represents the relationship sets for the source document being considered and C' represents the reduced condition corresponding to C. Items 1, 2, 3, and 4 remove redundant conditions. Item 5 also removes redundant conditions, but from a query with negation. Items 6 and 7 show how complex constructs (which typically require traversal to an arbitrary depth or height) are simplified.

185 is defined in terms of operators that are in turn defined by the DOM API. The operators used by the query system in the QEP are unique to this invention and are described below:

Root Operator returns the document root element. It is represented by Root(D), where D is the document under consideration.

Tree Traversal Operators are used to traverse the source document tree and perform pattern matches. For a tree traversal operator V, the subtree rooted at V (say T) specifies a pattern match condition. The candidate elements for V are checked for the pattern match. V returns true if and only if the candidate elements for V matched the pattern specified in T. The query system uses five different tree traversal operators, which are described below. Let A be the candidate element being considered for pattern match at the parent node of V. (Note that a tree traversal operator is never present as the root node of a QEP and therefore A is always defined.)

Descendant Operators identify descendant elements of A that satisfy the pattern match. These operators are denoted by Des(E, N, L, P), where E is a set of element names (the tag name for a candidate element for V should be specified in E) and L is the set of depths at which a candidate element for V can be present as a

TABLE 2

| No. | Condition specified in C | Condition present in S(D) | Condition in C' |
|---|---|---|---|
| 1 | (B, L) ∈ Des(A) | (((B, L') ∈ O(A)) AND (L' ⊆ L)) | φ |
| 2 | (B, L) ∈ Anc(A) | (((B, L') ∈ E(A)) AND (L' ⊆ L)) | φ |
| 3 | (B, L) ∈ Des(A) AND(C, $L_1$) ∈ Des(B) | (((C, {(B, L', $L'_1$)}) ∈ EL(A)) AND (L' ⊆ L) AND($L'_1$ ⊆ $L_1$)) | φ |
| 4 | B ∈ Child(A) | (((B, +) ∈ C(A)) OR ((B, ONCE) ∈ C(A))) | φ |
| 5 | (B, _) ∉ Des(A) | (B, _) ∉ R(A) | φ |
| 6 | (B, ANY) ∈ Des(A) | (B, L) ∈ R(A) | (B, L) ∈ Des(A) |
| 7 | (B, L) ∈ Anc(A) | (((B, L') ∈ E(A)) AND (L' ⊆ L)) | φ |

With the strength reduced query construct determined, the query optimizer 175 enumerates candidate QEPs for the "reduced" query. The "optimal" QEP is chosen by estimating the "cost" to perform the QEP. A cost model is used to estimate index access cost, the I/O cost for accessing elements, and the number of elements to be accessed. From (Q+S+I) the OQEP is selected and passed on to the query executor 185 for execution.

The query executor 185 executes the OQEP obtained from the query optimizer 175 and obtains the result set 180 for the document being considered. The query executor 185 uses the actual XML document in the document list 210 being reviewed, the structural relationship set (S) 135 and the indices (I) 140. The QEP is optimized for the document object model (DOM). The DOM is an application program interface (API) used by the query executor 185 for traversing the XML document tree structure. The query executor descendant of A. N is a count used to indicate how many of the candidate elements for this operator should satisfy the pattern match for V to return true. P specifies the path for reaching a candidate element for V from A. The specification of P is optional, and when no regular path expression is specified, P takes the value φ.

Ancestor Operators identify the ancestor elements of A that qualify. An ancestor operator is denoted by Anc(E, N, L, P), where E and N are as explained before. L is the set of heights at which a candidate element can be present as an ancestor of A. The optional P specifies the regular path expression for reaching A from a candidate element for V.

Sibling Operators identify the siblings of A that qualify. They are denoted by Sib(E, L), where E is a set of element names and L is the set of levels at which a candidate element can be present as a sibling of A. Right sibling levels are represented using positive numbers, and left sibling levels using negative numbers.

Text Operators perform match on the value contained in a text node of A. Three different text operators are defined by the query system 10.

Text1(Op, S) denotes the text operator used to check the value contained in any individual text node of A. Op is an operator, and S is a string or variable reference. This operator returns true if and only if A has a text node with value Val, such that Val(Op)S is true.

Text2(I, Op, S) denotes the text operator used to check the text value obtained by concatenating all the text node descendants of A at a height specified by "I".

Text3(Op, S) is used to check the text value obtained by concatenating all the text node descendants of A in a depth first order.

Attribute Operators perform matches on the attribute values of A. These operators are denoted by Attr(At, Op, S). This operator returns true if and only if A has an attribute named At with value Val which satisfies Val(Op)S. (It also uses type coercion.)

Logical Operators are AND, CR and NOT operators. A logical operator combines the boolean pattern match results of its children.

Aggregate Operators supported at present are Count and GroupBy operators. The Count operator is specified as Count(E1, E2, V), and it returns the number of children of $E_1$ that have tag $E_2$ and sets V to this value. The Group Operator is specified as Group($E_1$, S), and it groups all the children of $E_1$ based on the values for the attributes in S, and returns this grouped element.

Index Scan Operator is used to retrieve elements from a specified index structure. It is denoted by Index(F, S, K), where F is the index file name, S is the kind of index (this can be structure, text, or attribute) and K is the key used to obtain the set of element references. This operator looks up the specified index structures for the key K and obtains the set of element references. It then looks up the source document and retrieves the elements corresponding to these references.

Join Operator combines the results obtained from its child operators. This operator is denoted by Join(C), where C is a condition on which the join is performed. (This operator cannot be a leaf in the QEP).

A result set 180 obtained from the execution of the QEP, is then passed to the schema generator 220 (FIG. 6). The schema generator 220 then generates the DTD for the result set 180. This output DTD is obtained as a function of the user query and the DTD for the source document in the document list 210 that is being queried.

The process described for FIG. 6 is repeated for each document extracted by the source extractor 205. When the query processor 80 has processed all the documents extracted by the source extractor 205, the results are combined into one XML document by the result consolidator 190. The output DTDs computed by the schema generator 220 are merged and a DTD for the result document is obtained. This result document along with the output DTD is sent back to the user.

It is to be understood that the specific embodiments of the invention that have been described are merely illustrative of certain application of the principle of the present invention. Numerous modifications may be made to system of the invention described herein without departing from the spirit and scope of the present invention. Moreover, while the present invention is described for illustration purpose only in relation to the WWW, it should be clear that the invention is applicable as well to databases and other tables with indexed entries.

What is claimed is:

1. A query processing method for querying a plurality of hierarchical documents having corresponding schemas and contents, comprising:

extracting structural relationship sets from the schemes;

comparing a query against the structural relationship sets to determine if the query is to be executed on the hierarchical documents; and optimizing the query processing by filtering documents from the plurality of hierarchical documents that will produce an empty result;

wherein optimizing the query processing comprises maintaining an indexing structure for tree pattern matching;

wherein, for each non-filtered document, the indexing structure comprises three indices:

a value index that corresponds to a document content;

a structure index that corresponds to a tree structure pattern of the non-filtered document; and a link index that corresponds to link relationships between the non-filtered document and the plurality of hierarchical documents; and wherein optimizing the query processing further comprises, for each non-filtered document:

organizing the three indices as a trie; and querying the trie using tree pattern matching.

2. The query processing method of claim 1, wherein optimizing the query processing further further comprises eliminating the documents that will produce an empty result.

3. The query processing method of claim 1, wherein optimizing the query processing comprises removing redundant query constraints, and simplifying complex constraints, if any.

4. The query processing method of claim 3, wherein optimizing the query processing comprises determining if a query constraint will always be true, and removing such constraint.

5. The query processing method of claim 3, wherein optimizing the query processing further comprises simplifying complex query constraints into simpler query constraints.

6. The query processing method of claim 5, further comprising:

precomputing results for tree structure patterns of the non-filtered documents;

converting the tree structure patterns into strings;

storing the strings as part of the trie;

storing the precomputed results corresponding to each string as part of the indexing structure; and optimizing the query processing by querying the indexing structure.

7. The query processing method of claim 6, further comprising precomputing results for common tree structure patterns.

8. The query processing method of claim 7, wherein precomputing results comprising converting the tree structure patterns into strings, and maintaining a result for each tree structure pattern.

9. The query processing method of claim 7, wherein optimizing the query processing the documents comprise XML documents.

10. A query system for querying a plurality of hierarchical documents having corresponding schemas and contents, comprising:

a preprocessor comprising a relation set generator that computes structural relationship sets between elements and attributes of a schema, and an indexer that computes values and structure indices; and a query processor for performing a query and returning a result set, comprising:

a query optimizer that builds an execution plan for a document; and a query executor that executes the execution plan;

wherein the query processor compares the query against the structural relationship sets to determine if the query is to be executed on the documents; and wherein the query processor optimizes a query processing by filtering documents that will produce an empty result;

wherein the query processor optimizes by using the indices instead of executing the query on the actual documents;

wherein the query processor maintains an indexing structure for tree pattern matching;

wherein, for each non-filtered document, the indexing structure comprises three indices:

a value index that corresponds to a document content;

a structure index that corresponds to a tree structure pattern of the non-filtered document; and a link index that corresponds to link relationships between the non-filtered document and the plurality of hierarchical documents; and wherein, for each non-filtered document, the query processor further organizes the three indices as a trie; and queries the trie using tree pattern matching.

11. The query system of claim 10, wherein the query processor further comprises a result consolidator.

12. The query system of claim 11, wherein the query processor further comprises:

a schema extractor for extracting structural relationship sets from the schemas; and an indexing system.

13. The query system of claim 10, wherein the query processor optimizes the query processing by determining if the query to be executed on the hierarchical documents will produce an empty result, and eliminating all the documents conforming to the common schema that will produce an empty result.

14. The query system of claim 10, wherein the query processor further optimizes the query processing by removing redundant query constraints, and by simplifying complex constraints, if any.

15. The query system of claim 12, wherein the preprocessor further optimizes the query processing by:

precomputing results for tree structure patterns;

converting the tree structure patterns into strings;

storing the strings as a trie;

storing the precomputed results corresponding to each string as an index; and optimizing the query processing by querying the index.

16. The query system of claim 15, wherein the hierarchical documents comprise XML documents.

17. A query system having instruction codes for querying a plurality of hierarchical documents having corresponding schemas and contents, comprising:

a preprocessor comprising a first set of instruction codes for computing structural relationship sets between elements and attributes of a schema, and a second set of instruction codes for computing values and structure indices;

a query processor for performing a query and returning a result set, comprising:

a third set of instruction codes for building an execution plan for a document; and a fourth set of instruction codes for executing the execution plan;

a fifth set of instruction codes for comparing the query against the structural relationship sets to determine if the query is to be executed on the documents; and a sixth set of instruction codes for optimizing a query processing by filtering documents that will produce an empty result;

a seventh set of instruction codes for optimizing by using the indices instead of executing the query on the actual documents;

an eight set of instruction codes for maintaining an indexing structure for tree pattern matching;

wherein, for each non-filtered document, the indexing structure comprises three indices:

a value index that corresponds to a document content;

a structure index that corresponds to a tree structure pattern of the non-filtered document; and a link index that corresponds to link relationships between the non-filtered document and the plurality of hierarchical documents; and wherein, for each non-filtered document, the query processor further organizes the three indices as a trie; and queries the trie using tree pattern matching.

18. The query system of claim 17, wherein the query processor further comprises a result consolidator.

19. The query system of claim 18, wherein the query processor further comprises:

a schema extractor for extracting structural relationship sets from the schemas; and an indexing system.

20. The query system of claim 17, wherein the query processor optimizes the query processing by determining if the query to be executed on the hierarchical documents will produce an empty result, and eliminating all the documents conforming to the common schema that will produce an empty result.

21. The query system of claim 17, wherein the query processor further optimizes the query processing by removing redundant query constraints, and by simplifying complex constraints, if any.

22. The query system of claim 19, wherein the preprocessor further optimizes the query processing by:

precomputing results for tree structure patterns;

converting the tree structure patterns into strings;

storing the strings as a trie;

storing the precomputed results corresponding to each string as an index; and optimizing the query processing by querying the index.

* * * * *